Aug. 4, 1959   W. CORNELL ET AL   2,898,517
STRUCTURES FOR MOUNTING ELECTRICAL COMPONENTS
Filed May 10, 1955
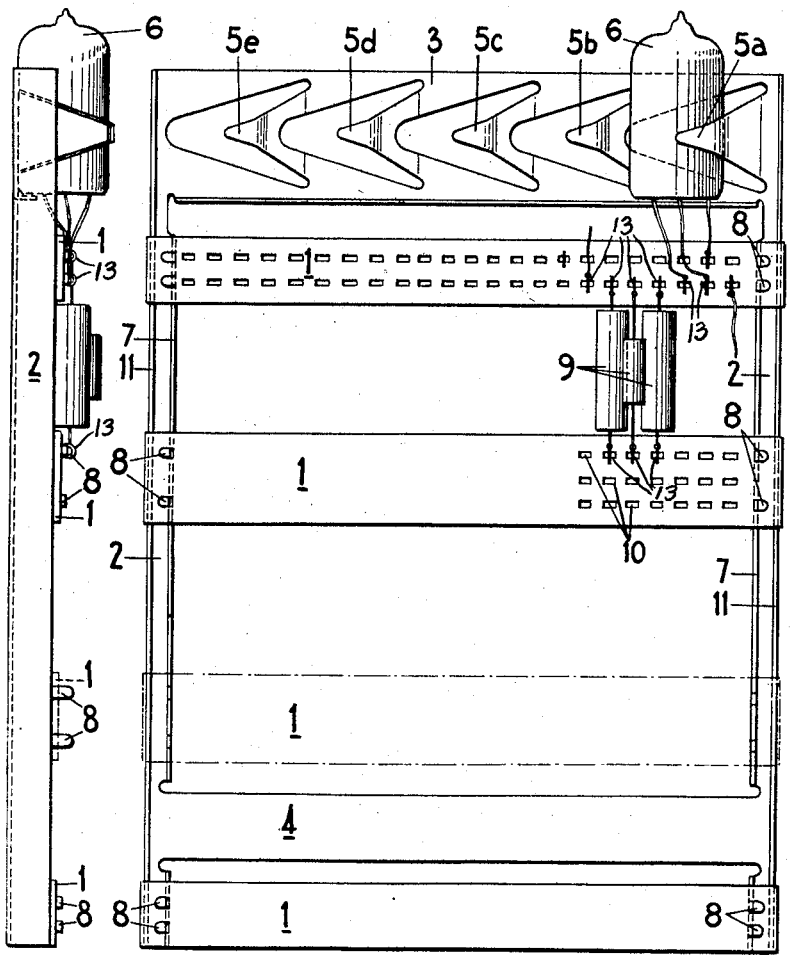
Fig.3                                    Fig.1
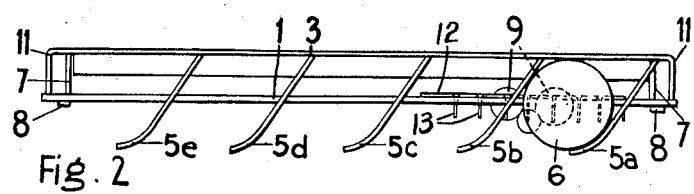
Fig.2
INVENTORS
WALTER CORNELL
SYDNEY ANTHONY SHEPHERD
BY
ATTORNEY United States Patent Office 2,898,517
Patented Aug. 4, 1959

2,898,517

STRUCTURES FOR MOUNTING ELECTRICAL COMPONENTS

Walter Cornell and Sydney Anthony Shepherd, Coventry, England, assignors to The General Electric Company Limited, London, England Application May 10, 1955, Serial No. 507,357

Claims priority, application Great Britain May 12, 1954

4 Claims. (Cl. 317—101)

This invention relates to structures for mounting electrical components.

It is an object of the present invention to provide an improved structure for mounting wire-ended electrical components such as capacitors, resistors, rectifiers and gas discharge tubes.

According to the present invention, a structure for mounting electrical components comprises one or more insulating members lying across a frame, the insulating member or each of the insulating members being provided with a plurality of small holes wherein electrical terminals may be formed to facilitate the mounting of electrical wire-ended components on the said member or members and/or between the said members as the case may be, and whereby electrical connections to or between the said components may be made by means of conducting leads.

Preferably the insulating member or members do not lie within the frame.

The said frame may be of metal such as mild steel or aluminium or may be constructed from strips of insulating material such as the thermosetting plastic material sold under the registered trademark "Bakelite."

The terminal holes in the insulating member or each of the insulating members may be of square, circular, rectangular or other suitable cross-section and may be arranged in rectilinear rows along the member, each member having one or more such rows and the several rows being parallel to one another. The insulating member or members are preferably of the thermosetting plastic material "Bakelite."

An electrical component mounting structure in accordance with the present invention will now be described, by way of example, with reference to the three figures of the accompanying diagrammatic drawings in which:

Figure 1 shows a plan view of the mounting structure,

Figure 2 shows an end elevation of the mounting structure, and

Figure 3 shows a side elevation of the mounting structure.

Referring now to the drawing, the mounting structure comprises a rectangular frame of mild steel, brass or aluminium and four "Bakelite" insulating members 1 which lie across the frame. The frame comprises two side members 2 and two cross members 3 and 4 and is formed from a single sheet of metal by stamping in a press. The cross member 3 is provided with five tongues 5. These tongues 5a to 5e are stamped from the cross member 3 and bent at an angle of about 45 degrees thereto. Each tongue is substantially triangular in shape, its base being integral with the cross member 3 and its apex curving towards that member 3. Electrical components such as the valve 6, which may be a cold cathode gas discharge triode, can thus be mounted on the cross member 3. As shown the valve 6 is located between the main body of the cross member 3, the curved end surface of one tongue 5a and part of the outer surface of the adjacent tongue 5b.

Each side member 2 is in the form of a U shaped channel along part of its length, the walls of the channel being perpendicular to the plane of the frame. The inside wall 7 of each U shaped channel is provided with a plurality of teeth-like projections 8 whereby the insulating members 1 are secured to the frame as described hereinafter.

The insulating members 1 are so spaced as to permit wire-ended components, such as the components 9, to lie therebetween and are provided with a plurality of small terminal holes 10, only some of which are shown. These terminal holes 10 are of rectangular cross-section and are arranged in rectilinear rows along the members 1, each member having two or three rows and all the rows being parallel to one another.

In assembly the insulating members 1 are placed across the frame with the teeth-like projections 8 engaging with holes in the end thereof and the ends of the insulating members 1 resting on the edges of both walls 7 and 11 of the side members 2. The teeth-like projections 8 are thereafter bent in an outward direction to secure the insulating members 1 to the frame.

It should be understood that the invention is not restricted to the use of a metal frame. Thus in an alternative arrangement the side members of the frame are made up of two or more similarly shaped strips of the thermosetting plastic material "Bakelite" which can be clamped together by means of bolts. The cross members, which may be of metal or of insulating material, and the insulating members, which are as described above, are fixed at their ends to these side members by means of staples. Each staple comprises a length of wire bent to form three sides of a rectangle. The legs of each staple pass through holes in the end of the associated cross member or insulating member as the case may be, and thence between the adjacent faces of two strips of a side member. These legs should preferably be of such a length as to penetrate the full depth of the gap between the said strips. When all the cross members and the insulating members are in position the bolts through each side member are tightened, the legs of the staples being thus clamped between the said strips. Preferably the cross members and insulating members are attached to opposite sides of the frame, it being found in practice that such an arrangement has greater rigidity.

A suitable method of mounting wire-ended electrical components on or between the insulating members of such a structure is briefly as follows:

Each insulating member 1 is provided with one or more electrical conducting leads, such as the leads 12 (Fig. 2), of for example tin-plated copper wire. These leads, which are subsequently employed as connections to and between the various electrical components, are each provided with a series of spaced loop portions 13. With the structure illustrated in the accompanying drawings, the dimensions of each loop portion 13 are such that it will just pass through a terminal hole 10 in the insulating member 1 when the plane of the loop portion 13 is substantially parallel to the longer walls of the terminal hole 10, a part of the loop portion 13 then projecting beyond the member 1 on the side thereof remote from the lead from which it is formed. The projecting part of each loop portion 13 is turned through about a right angle to lie in a plane which is substantially parallel to the shorter walls of its terminal hole 10. The loop portions 13 are thus prevented from receding into the terminal holes 10.

With the method described above, sets of inter-connected terminals or eyelets are formed by the loop portions 13 to which the wire ends of wire-ended components can be secured, as for example by soldering.

An alternative method of mounting wire-ended components on or between the insulating members 1 is to form a loop portion in each component wire end, these loop portions being then employed to form terminals or eyelets in the manner previously described.

We claim:

1. A structure for mounting electrical components comprising a rectangular frame which comprises side members constituting the sides of the frame and cross members lying between the side members and in which one of the cross members is provided with a plurality of metal clips for the attachment to that cross member of electronic valves and the side members have strip portions that lie generally parallel to one another with edge surfaces thereof lying substantially in the same plane, at least one insulating member which lies across the frame and which is provided with a plurality of small holes, the said edge surfaces supporting the insulating member near its ends, a plurality of fixing means which are attached to the strip portions and which project from the side members through holes in the insulating member, a portion of each fixing means that lies on the side of the insulating member remote from the side members being turned through about a right angle so as to engage the adjacent surface of the insulating member and hold that member in position on the side members, and a plurality of electric terminals fixed in the said holes to facilitate the mounting of electrical wire-ended components and to enable electrical connections to be made to those components.

2. A structure according to claim 1 in which the said clips are formed from the cross member and are of unitary construction with that member, each clip being adapted to engage the envelope of an electronic valve between the cross member and a portion of the clip.

3. A structure for mounting electrical components comprising a rectangular frame which comprises side members constituting the sides of the frame and cross members lying between the side members and in which one of the cross members is provided with a plurality of metal clips for the attachment to that cross member of electronic valves and the side members have strip portions that lie generally parallel to one another with edge surfaces thereof lying substantially in the same plane, a plurality of insulating members which lie across the frame and which are each provided with a plurality of small holes, the said edge surfaces supporting each insulating member near its ends, a plurality of fixing means which are attached to the strip portions and which project from the side members through holes in the insulating members, portions of the fixing means that lie on the side of each insulating member remote from the side members each being turned through about a right angle so as to engage the adjacent surface of the associated insulating member and hold that member in position on the side members, and a plurality of electric terminals fixed in the said holes to facilitate the mounting of electrical wire-ended components and to enable connections to be made to those components.

4. A structure according to claim 3 in which the said clips are formed from the cross member and are of unitary construction with that member, each clip being adapted to engage the envelope of an electronic valve between the cross member and a portion of the clip.

References Cited in the file of this patent

UNITED STATES PATENTS

| | | |
|---|---|---|
| 1,151,497 | Reinke | Aug. 24, 1915 |
| 1,694,382 | Hemingway | Dec. 11, 1928 |
| 2,444,037 | Fritschi | June 29, 1948 |
| 2,512,908 | Arndt | June 27, 1950 |
| 2,703,377 | Hings | Mar. 1, 1955 |
| 2,754,454 | McNutt | July 10, 1956 |
| 2,755,048 | Warsher | July 17, 1956 |
| 2,787,735 | Scal | Apr. 2, 1957 |

FOREIGN PATENTS

| | | |
|---|---|---|
| 664,024 | Great Britain | Jan. 2, 1952 |
| 700,517 | Great Britain | Dec. 2, 1953 |